Nov. 4, 1969 W. J. FLANNIGAN 3,475,858
PLANTER SHROUD AND PLANTER

Filed Dec. 14, 1967

INVENTOR.
WILLIAM J. FLANNIGAN
BY *Elliott & Pastoriza*
ATTORNEYS

3,475,858
PLANTER SHROUD AND PLANTER
William J. Flannigan, Oxnard, Calif. (1054 Knollwood Drive, Rte. 1, Omena Lake, Sturgis, Mich. 49091)
Filed Dec. 14, 1967, Ser. No. 690,670
Int. Cl. A01g 9/02
U.S. Cl. 47—34
4 Claims

ABSTRACT OF THE DISCLOSURE

A shroud is provided for a planter of the type employed on malls for towns and cities. The shroud is in the form of a hollow body with an open bottom for positioning over the planter, the top of the shroud including an inwardly and downwardly directed lip defining a central opening through which the plant in the planter extends when the shroud is positioned over the planter. By use of such a shroud, the planter may readily be provided with a dressed appearance and the planter itself, being completely hidden by the shroud can be manufactured without the normal lip structure and thus susceptible to a matched steel die single molding operation.

---

This invention relates generally to planters and more particularly to a shroud for planters and a shroud and planter combination.

Planters of the type over which the present invention constitutes an improvement, are often used for small sized trees in decorating malls or various streets in towns and cities. Normally, these planters are designed with an upwardly and inwardly directed lip defining a central opening through which the plant itself extends. The bottom of the planter is closed and there may be provided annular exterior bottom ribs for supporting the planter.

Such a construction as the foregoing necessitates a dual molding operation in forming the planter. In other words, the surrounding planter wall and upper lip constitute a first part which may readily be molded and the bottom of the planter constitutes a second molded part. After the two parts are molded, the bottom portion is joined to the bottom edge of the side wall of the planter. The reason that a single molding operation is not possible is because of the inwardly directed lip at the upper end which would prevent removal of a single integral side wall and bottom portion from the mold. In this respect, the manufacturing expense of such planters is increased over that which would result if the entire planter could be formed by a single molding operation.

In addition to the foregoing, when such planters are provided on a mall wherein other construction of buildings and the like is taking place, the planters are subject to disfiguration; for example, from splattered paint, splattered concrete, or general damage by workers in the vicinity in carrying materials to complete other portions of the mall. The placement and planting of the planters takes considerable time and it is desirable to have these decorative portions of the mall in place by the completion date. Generally ceremonies are performed on such completion date and in order to assure the desired decorative effects provided by the planters, they must be placed several days before such date. It is during this time that the above-referred damage to the planters occurs.

The foregoing could be solved if it were possible to truck in all of the planters and plants at the last moment and position them as desired. However, time does not permit such an operation to be carried out.

As a consequence of all of the foregoing, at a date close to the completion date, workers must clean individually the various planters and perhaps even re-finish some of the planters or even replace the same in order that they will appear new and attractive. This operation, of course, increases the overall expense and time involved in completing a planned mall.

With all of the foregoing considerations in mind, it is a primary object of the present invention to provide a unique shroud structure for a planter as well as a shroud in combination with an improved planter such that the above problems are overcome.

More particularly, it is an object to provide a shroud so designed as to be readily positionable over a planter already in place on a mall at the last minute before the completion ceremonies which functions to completely eclipse the planter and any defacement thereof, the shroud itself lending a new and decorative appearance all to the end that the various planters are in condition for exhibition at a specified date.

Another object is to provide a combination shroud and planter so designed that the planter itself may be manufactured by means of a single molding operation and wherein the shroud itself may also be manufactured by a single molding operation and yet when the shroud is received over the planter, the overall appearance is that of a single planter having the same aesthetic features as planters heretofore provided, with the advantage that great economies are realizable.

Still other objects of this invention are to provide unique shrouds and planter-shroud combinations wherein the shrouds themselves may be manufactured for considerably less expense than an overall planter and wherein different shrouds having unique designs and colors may be substituted on any one planter to provide a desired aesthetic effect.

Briefly, these and many other objects and advantages of this invention are attained by providing a basic planter in the form of an enclosing side wall having an integrally formed closed bottom. No lip structure is provided on the open top of the planter such that the planter itself may be readily formed by a single molding operation such as by means of matched steel dies. A shroud is provided in the form of a hollow body having an open bottom positionable over the planter. The upper end of the shroud includes an inwardly and downwardly directed lip defining a central opening through which a plant extends when the shroud is positioned over the planter. The length of the side wall of the planter in a generally vertical direction is co-extensive with that of the shroud so that when the shroud is in position, the planter itself is completely eclipsed.

In a preferred embodiment, the upper end of the side wall of the planter includes at least one scalloped portion to provide communication between the interior of the planter and the space between the exterior of the planter side wall and interior side walls of the shroud. Any excess water on the plants as might occur if inadvertently the planter is filled to an overflow condition, passes through the scalloped opening at the top of the planter and down the inside of the shroud and thus the exterior appearance of the overall structure is not soiled.

In addition to the foregoing, with the shroud structure as provided, planters may be initially planted and positioned well before a completion date along a mall and then at the last moment before the completion date, the shrouds themselves may be positioned over the planters so that the entire mall will be in attractive condition for completion ceremonies. At future dates, the shrouds themselves may readily be removed and replaced by other shrouds of a different exterior design or color if desired.

A better understanding of the invention will be had by now referring to a preferred embodiment thereof as illustrated in the accompanying drawings, in which.

Figure 1:
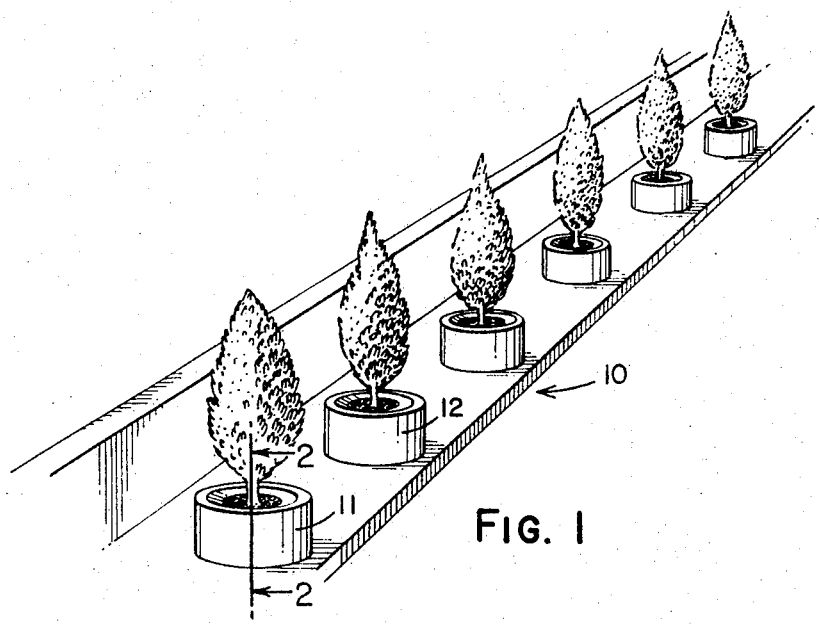
FIGURE 1 is a fragmentary perspective view illustrating a series of conventional planters as may be positioned along a mall merely by way of example.

Referring first to FIGURE 1 there is illustrated a mall area 10 along the center strip of which there is provided a series of planters such as indicated at 11 and 12. These planters are such that their planting and proper positioning on the mall requires considerable time and therefore is usually performed well in advance of the completion date for the mall. As a consequence, and as mentioned heretofore, they are subject to deterioration and external damage by workers in the area completing other portions of the mall.

The construction of the various planters illustrated in FIGURE 1, which are typical of prior art planters, is identical and therefore a detailed description of one will suffice for all.

Figure 2:
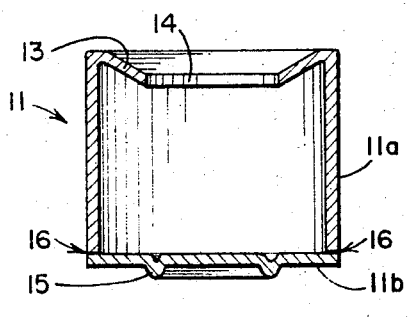
FIGURE 2 is a cross section of one of the planters of FIGURE 1 taken in the direction of the arrows 2—2.

Thus, referring to the cross section of FIGURE 2 illustrating the planter 11, the structure comprises a generally hollow body which may be cylindrical in shape having a side wall 11a terminating in a closed bottom 11b. The upper end of the side wall includes an inwardly and downwardly directed lip 13 defining a central opening 14 through which a plant extends. The closed bottom may include annular rib means such as indicated at 15 to serve as a support for the planter and hold a major portion of the bottom at a given level above the ground.

Because of the inwardly and downwardly directed lip structure 13, it is necessary that the planter as described in FIGURE 2 be made in two molding operations or by means of a split mold. Thus, the side wall 11a and lip structure can be formed in a single molding operation and the bottom portion 11b formed in a second molding operation. The walls and bottom must then be fused or joined together as at 16. Alternatively, a two-part mold may be provided which must be separated at the points 16. Finishing of the joint 16 is then required.

Figure 3:
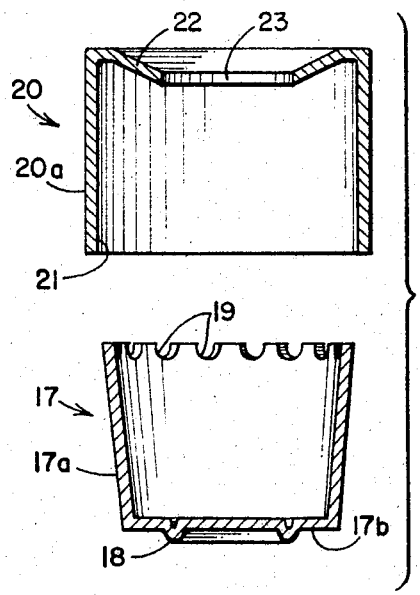
FIGURE 3 is an exploded cross-sectional view of a shroud and improved planter in accordance with the present invention; and, FIGURE 4 is a view of the shroud and planter of FIGURE 3 in assembled relationship.

Referring now to FIGURE 3 there is illustrated the improved shroud and planter of the present invention. Referring first to the lower portion of FIGURE 3, there is illustrated a planter 17 in the form of an enclosing side wall 17a and integrally formed closed bottom 17b. This bottom may include annular ribs 18 as shown. The upper end of the side wall of the planter includes scallops 19 the purpose for which will become clearer as the description proceeds.

It will be noted in FIGURE 3 that the cross-sectional area of the upper portion of the planter is at least as great as the cross-sectional area of the closed bottom 18. In other words, the walls extend upwardly in a generally straight path which may be vertical or diverge slightly such as shown in FIGURE 3. Under no circumstances, however, do these walls converge such that the upper area of the planter would be less than the cross-sectional area of the closed bottom. As a result of this construction, it will be evident that the planter 17 may be formed in a single molding operation such as by matched steel dies.

Above the planter 17 of FIGURE 3 there is illustrated the shroud of this invention designated generally at 20. This shroud takes the form of a hollow body defined by side walls 20a terminating in an open bottom 21 adapted to be positioned over the planter 17. The upper end of the side walls includes an inwardly and downwardly extending lip 22 defining a central opening 23 through which a plant in the planter 17 will extend when the shroud 20 is positioned over the planter.

Figure 4:
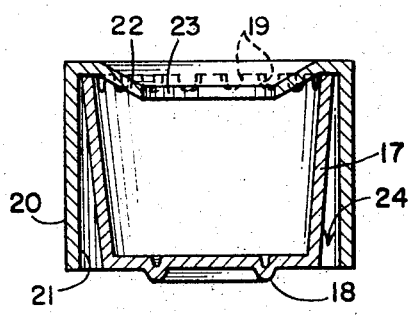

Referring to FIGURE 4, the shroud is shown in position over the planter and it will be evident that the length of the respective side walls for the shroud and planter in a generally vertical direction are substantially co-extensive so that the shroud will completely eclipse the planter.

The scalloped portions 19 at the upper end of the walls of the planter function to provide communication between the interior of the planter and the space between the wall of the planter and the interior wall of the shroud, this space being indicated at 24. By this arrangement, there is provided an egress means for water filling the planter which may overflow such that the water is received within the space 24 rather than soiling the outside of the shroud.

In the shroud as described in FIGURES 3 and 4 the side walls 20a extending downwardly in a generally straight path in such a manner that the cross-sectional area of the open bottom 21 is at least as great as the cross-sectional area of the upper portion of the shroud. Again, as in the case of the planter, this construction permits the shroud to be manufactured by a single molding operation such as by means of matched steel dies.

In operation, various planters may be formed as described in FIGURE 3 in a single molding operation and thus economically produced. These planters may then be planted and placed along the mall 10 at any convenient time. Just before a completion date arrives, the contractor may then position various shrouds over the planter such as described in FIGURES 3 and 4 to provide a dressed appearance for the planter and eclipse any marring, splattered paint, concrete, or other damage to the planters.

Not only may the planters themselves be manufactured considerably more economically as a consequence of the present arrangement in combination with a shroud, but in addition, the shrouds per se are considerably less expensive to produce than the planters and thus they may readily be replaced should any damage occur to the shrouds.

From the foregoing, it will thus be evident that the present invention has provided an improved shroud and planter wherein all of the various objects heretofore set forth are fully realized.

What is claimed is:

1. In combination: a planter having an enclosing side wall and integrally formed closed bottom, said side wall extending in a straight path upwardly to terminate in an open top of cross-sectional area at least equal to the cross-sectional area of said bottom such that said wall and bottom can be formed by a matched steel die single molding operation; and a shroud having an open bottom and positioned on said planter, the side walls of said shroud extending downwardly in a straight path such that the cross-sectional area of said open bottom is at least equal to the cross-sectional area of the upper portion of said shroud, the upper end of said shroud including an integrally formed inwardly and downwardly directed lip defining a central opening through which a plant in said planter extends when said shroud is positioned on said planter, said side walls of said shroud and lip structure being such that said shroud can be formed by a matched steel die single molding operation, and whereby said shroud can be manually positioned over said planter after a plant has been planted in the planter to provide a dressed appearance for said planter.

2. The subject matter of claim 1, in which the upper edge of the side wall of said planter defining said open end is provided with at least one scalloped portion to define a communication opening between the interior of said planter and the space defined between the exterior of the side wall of said planter and the interior side walls of said shroud when said shroud is positioned over said planter.

3. The subject matter of claim 2, in which said closed bottom of said planter includes integrally formed annular rib means defining a supporting structure for said planter to hold the major area of the closed bottom in spaced relationship to the ground.

4. The subject matter of claim 1, in which the length of the side walls of said shroud in a generally vertical direction is substantially co-extensive with the length of the side wall of said planter in said direction such that said planter is substantially eclipsed by said shroud.

References Cited

UNITED STATES PATENTS

| 135,173 | 1/1873 | Timby | 47—30 |
| 757,045 | 4/1904 | Lane | 47—27 |

ROBERT E. BAGWILL, Primary Examiner

U.S. Cl. X.R.

47—30; 220—8